US011799982B2

(12) United States Patent
Dong

(10) Patent No.: US 11,799,982 B2
(45) Date of Patent: Oct. 24, 2023

(54) MESSAGE PUSH METHOD, APPARATUS, DEVICE AND MEDIUM

(71) Applicant: BOE Technology Group Co., Ltd., Beijing (CN)

(72) Inventor: Chaofeng Dong, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 51 days.

(21) Appl. No.: 17/539,488

(22) Filed: Dec. 1, 2021

(65) Prior Publication Data

US 2022/0303347 A1    Sep. 22, 2022

(30) Foreign Application Priority Data

Mar. 19, 2021    (CN) .......................... 202110296163.9
May 25, 2021    (CN) .......................... 202110574237.0

(51) Int. Cl.
*H04L 67/55* (2022.01)
*H04L 67/146* (2022.01)
*H04L 67/51* (2022.01)
*H04L 67/562* (2022.01)

(52) U.S. Cl.
CPC ............ *H04L 67/55* (2022.05); *H04L 67/146* (2013.01); *H04L 67/51* (2022.05); *H04L 67/562* (2022.05)

(58) Field of Classification Search
CPC ....... H04L 67/55; H04L 67/51; H04L 67/562; H04L 67/146
See application file for complete search history.

(56) References Cited

U.S. PATENT DOCUMENTS

| 2015/0026356 | A1* | 1/2015 | Kaplinger | H04L 67/55 |
| | | | | 709/230 |
| 2016/0028840 | A1* | 1/2016 | Krishnan | H04W 4/10 |
| | | | | 709/204 |
| 2018/0019961 | A1* | 1/2018 | Liu | H04L 12/1859 |
| 2019/0199674 | A1* | 6/2019 | Jain | H04L 51/234 |
| 2020/0366643 | A1* | 11/2020 | Hoarau | H04L 12/1822 |

* cited by examiner

*Primary Examiner* — Wing F Chan
*Assistant Examiner* — Billy H Ng
(74) *Attorney, Agent, or Firm* — IPRO, PLLC

(57) ABSTRACT

The present application discloses a message push method, apparatus, device and medium. The method includes: receiving a message push request, where the message push request carries a message identifier of a to-be-pushed target message, terminal identifiers of target terminals for receiving the target message, and a channel identifier of a service channel for pushing the target message; and pushing the target message to the target terminals according to the channel identifier.

13 Claims, 7 Drawing Sheets

MESSAGE PUSH METHOD, APPARATUS, DEVICE AND MEDIUM

CROSS-REFERENCE TO RELATED APPLICATIONS

The present application claims a priority to the Chinese patent application No. 202110296163.9 filed in China on Mar. 19, 2021, and claims a priority to the Chinese patent application No. 202110574237.0 filed in China on May 25, 2021, disclosures of which are incorporated herein by reference in its entirety.

TECHNICAL FIELD

The present application generally relates to the field of message processing technologies, specifically relates to field of message push technologies, and in particular to a message push method, apparatus, device and medium.

BACKGROUND

In the corporate governance framework, message push has become very common. For a receiver, timeliness is required for the message push; for a pusher, accuracy and correctness of data statistics are required.

In related art, a message push platform is usually limited by the number of push protocols and can only push messages through a fixed protocol channel, which has poor compatibility, or when adding push protocols, secondary development is required, which brings difficulty to an application layer.

SUMMARY

In a first aspect, one embodiment of the present disclosure provides a message push method, including: receiving a message push request; wherein the message push request carries a message identifier of a to-be-pushed target message, terminal identifiers of target terminals for receiving the target message, and a channel identifier of a service channel for pushing the target message; and pushing the target message to the target terminals according to the channel identifier.

In some embodiments, the pushing the target message to the target terminals according to the channel identifier, includes: querying a communication interface corresponding to the service channel according to the channel identifier, wherein the communication interface is a message transmission path established when a binding relationship is established between the service channel and a service unit; and pushing the target message to the target terminals through the communication interface.

In some embodiments, the pushing the target message to the target terminals through the communication interface, includes: extracting to-be-pushed message data from a stored message queue according to the message identifier; when push time is reached, identifying validity of the message data; if the message data is valid, pushing the target message to the target terminals through the communication interface; and if the message data is invalid, deleting the message data from the message queue.

In some embodiments, before the receiving the message push request, the method further includes: receiving a binding request for binding the service channel, wherein the binding request carries interface information of the communication interface and a service identifier of a service unit; establishing a binding relationship between the service channel and the service unit according to the interface information and the service identifier.

In some embodiments, the method further includes: obtaining the channel identifier of the service channel and configuration information corresponding to the channel identifier; generating an interface framework of the service channel according to the channel identifier and configuration information; based on the interface framework, configuring the interface information corresponding to the service channel.

In some embodiments, the service identifier includes a project identifier, and the service channel establishes a binding relationship with each service unit; the establishing the binding relationship between the service channel and the service unit according to the interface information and the service identifier, includes: querying and obtaining at least one service unit that matches the project identifier from a service unit list according to the project identifier; for each service unit, establishing a message transmission channel between the service channel and the service unit through the interface information, thereby establishing the binding relationship between the service channel and the service unit.

In some embodiments, the service identifier includes a project identifier, and the service channel establishes a binding relationship with any service unit; the establishing the binding relationship between the service channel and the service unit according to the interface information and the service identifier, includes: querying and obtaining at least one service unit that matches the project identifier from a service unit list according to the project identifier; identifying a first service unit that has not established a binding relationship from the at least one service unit; establishing a message transmission channel between the service channel and the first service unit through the interface information, thereby establishing the binding relationship between the service channel and the first service unit.

In some embodiments, the push request further includes a project identifier; the querying the communication interface corresponding to the service channel according to the channel identifier, includes: querying second service units that match the project identifier from a service unit list according to the project identifier; obtaining first channel identifiers of service channels that have binding relationship with the second service units; querying a first service channel matching the channel identifier from the first channel identifiers; and obtaining a communication interface corresponding to the first service channel.

In some embodiments, when there is a binding relationship between the service channel and each service unit, the pushing the target message to the target terminals through the communication interface, includes: obtaining a message push task inventory of each second service unit, and sending the message push request to the second service unit with the smallest message push task inventory, thereby pushing the target message to the target terminal through a communication interface corresponding to the service channel bound to the second service unit with the smallest message push task inventory.

In a second aspect, one embodiment of the present disclosure provides a message push method, including: calling a configuration interface for message push, wherein the configuration interface includes a strategy control for configuring message push strategy; monitoring the strategy control to obtain a message identifier of a to-be-pushed target message, terminal identifiers of target terminals for receiving the target message, and a channel identifier of a service channel for pushing the target message; generating a message push request according to the message identifier, terminal identifiers, and the channel identifier; and sending the message push request to the server, so that the server pushes the target message to the target terminals according to the channel identifier.

In some embodiments, the method further includes: querying, by the server, a communication interface corresponding to the service channel according to the channel identifier in the message push request, wherein the communication interface is a message transmission path established when a binding relationship is established between the service channel and a service unit; pushing the target message to the target terminals through the communication interface.

In some embodiments, the configuration interface further includes a binding control of the service channel, the server includes at least one service unit, and the method further includes: monitoring the binding control to obtain interface information of the communication interface and a service identifier of the service unit; generating a binding request according to the interface information and the service identifier; sending the binding request to the server, so that the server establishes the binding relationship between the service channel and the service unit according to the binding request.

In some embodiments, the method further includes: receiving statistical information sent by the server, wherein the statistical information is generated by the server according to push results of the target information; when receiving a statistical query instruction, generating and displaying a statistical information display interface according to the statistical information.

In a third aspect, one embodiment of the present disclosure provides a message push apparatus, including: a receiving module configured to receive a message push request, wherein the message push request carries a message identifier of a to-be-pushed target message, terminal identifiers of target terminals for receiving the target message, and a channel identifier of a service channel for pushing the target message; a push module configured to push the target message to the target terminals according to the channel identifier.

In some embodiments, the message push apparatus further includes a query module, configured to query a communication interface corresponding to the service channel according to the channel identifier, wherein the communication interface is a message transmission path established when a binding relationship is established between the service channel and the service unit.

In some embodiments, the push module is further configured to, extract to-be-pushed message data from a stored message queue according to the message identifier; when push time is reached, identify validity of the message data; if the message data is valid, push the target message to the target terminal through the communication interface; and if the message data is invalid, delete the message data from the message queue.

In some embodiments, the receiving module is further configured to, receive a binding request for binding the service channel, wherein the binding request carries interface information of the communication interface and a service identifier of a service unit; establish a binding relationship between the service channel and the service unit according to the interface information and the service identifier.

In a fourth aspect, one embodiment of the present disclosure provides a message push system, including: a display device; an electronic device in communication with the display device. The electronic device is configured to execute the foregoing method.

In a fifth aspect, one embodiment of the present disclosure provides an electronic device, including a memory, a processor, and a computer program stored on the memory and executable on the processor, wherein the processor executes the computer program to implement the foregoing message push.

In a sixth aspect, one embodiment of the present disclosure provides a computer-readable storage medium, including a computer program stored thereon. The program is executed by a processor to implement the foregoing message push.

In the embodiment of the present application, after receiving the message push request, the target message can be pushed to the target terminals according to the pre-established binding relationship between the service channel and the service unit. In the present application, a variety of message push protocol services are encapsulated in the server in advance. After the user binds the service unit to the corresponding service channel, the user can directly implement message push through the message push request, which effectively improves compatibility of message push and can meet diverse message push needs of different users.

Additional aspects and advantages of the present application will be given in the following description, which will become apparent from the following description, or be understood through practice of the present application.

BRIEF DESCRIPTION OF THE DRAWINGS

The foregoing and/or additional aspects and advantages of the present application will become apparent and easy to understand from the following description of the embodiments in conjunction with the accompanying drawings, in which.

DETAILED DESCRIPTION

Figure 1:
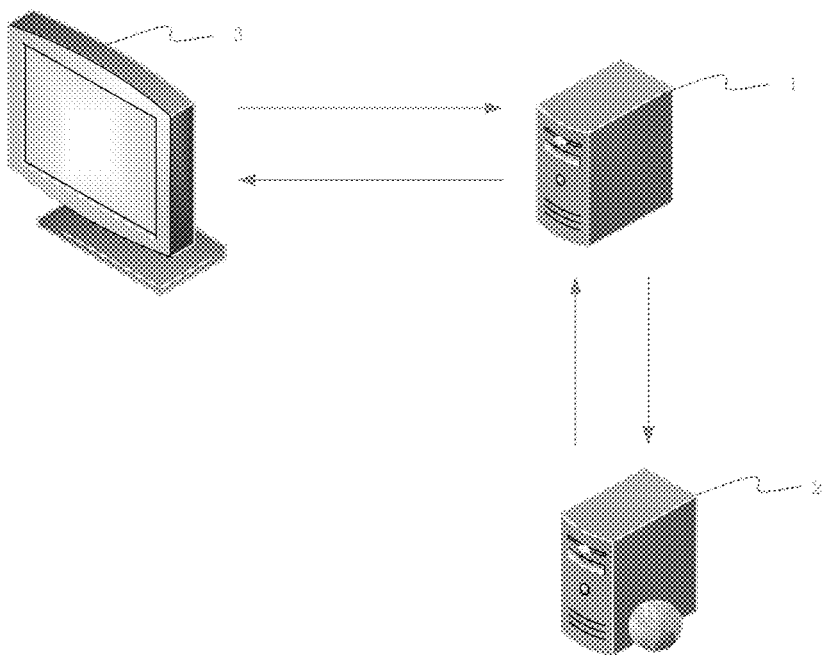
FIG. 1 is a schematic diagram of an application scenario of a message push method according to an embodiment of the present application.

The present application will be further described in detail hereinafter with reference to the drawings and embodiments. It can be understood that the specific embodiments described here are only used to explain the relevant disclosure, but not to limit the disclosure. In addition, it should be noted that, for ease of description, only parts related to the disclosure are shown in the drawings.

It should be noted that the embodiments in the present application and the features in the embodiments may be combined with each other in case that there is no conflict. The present application will be described hereinafter in detail with reference to the drawings and in conjunction with embodiments.

A specific implementation environment of a message push method proposed in the present application is shown in FIG. 1. FIG. 1 is a schematic diagram of an application scenario of a message push method according to an embodiment of the present application. As shown in FIG. 1, the application scenario in this embodiment involves an electronic device 3, a background server 1 of the electronic device and a server 2. The background server 1 of the electronic device is configured to control display content of the electronic device 3 and receive instructions or information input by a user through the electronic device 3. The server 2 is in communication with the background server 1, receives a message push request sent by the background server 1, and sends the received message push request to a dynamically configured service unit Broker, so that the service unit Broker executes the message push request, and feeds back an execution statistics result to the background server 1. For example, a display interface of the electronic device 3 displays a message push management system through which the user sends target messages to a target terminal. For example, the user configures a push strategy for a to-be-pushed target message in an interface of the message push management system, then clicks "message push" operation with a mouse or finger to trigger the user's push request for the target message. The push request carries the push strategy of the target message. Then, the backend server 1 sends, to the server 2, the user's push request for pushing the target message. After the server 2 receives the user's push request for the target message, the server 2 executes a message push method provided in the embodiment of the present application, to push the target message to a target terminal according to a service channel interface in the push strategy, generate statistical information according to a push result of the target message, and send the statistical information to the background server 1. Then, the background server 1 pushes the statistical information to the electronic device 3, and then the electronic device 3 displays a result of the message push performed by the user.

The background server 1 and the server 2 may be integrated or separated, which is not limited in the present application. For example, when the background server 1 and the server 2 are separated, the background server 1 may be a control device of the user's local computer, and the server 2 may be a remote cloud server. For another example, when the background server 1 and the server 2 are integrated, the background server 1 communicates with and controls the electronic device (display device) 3; and data transmission between the background server 1 and the server 2 is realized through internal signal transmission.

It should be noted that the application scenario shown in FIG. 1 is only an example, and the present application does not limit this.

In order to further illustrate the technical solutions provided in the embodiments of the present application, this will be described in detail hereinafter with reference to the drawings and specific implementations. Although the embodiments of the present application provide method operation instruction steps shown in the following embodiments or drawings, more or less operation instruction steps may be included in the method based on conventional or no creative labor. In steps where there is no logically necessary causality, an execution order of these steps is not limited to the execution order provided in the embodiments of the present application. The method may be executed sequentially or in parallel according to the method shown in the embodiments or the drawings during actual processing or when executed by a device.

Figure 2:
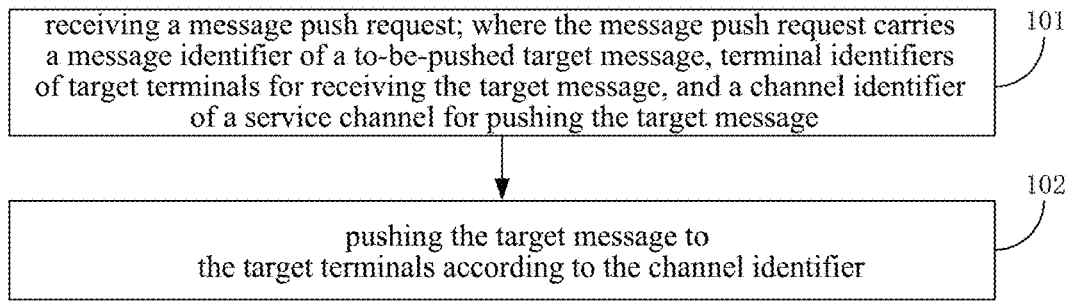
FIG. 2 is a flowchart of a message push method performed by a server according to an embodiment of the present application.

FIG. 2 is a flowchart of a message push method according to an embodiment of the present application. It should be noted that an execution entity of the message push method in this embodiment is a message push apparatus, and the message push apparatus may be implemented by software and/or hardware. The message push apparatus in this embodiment is configured in a server.

As shown in FIG. 2, a message push method provided in an embodiment of the present application includes the following steps.

Step 101: receiving a message push request; where the message push request carries a message identifier of a to-be-pushed target message, terminal identifiers of target terminals for receiving the target message, and a channel identifier of a service channel for pushing the target message.

It should be noted that the background server of the electronic device monitors an interactive interface of the electronic device to obtain the message identifier of the to-be-pushed target message entered by the user in the interactive interface, the terminal identifier of the target terminal for receiving the target message, and the channel identifier of the service channel for pushing the target message, and generates a message push request according to the message identifier, the terminal identifier and the channel identifier. The background server sends the message push request to the server, and the server receives the message push request.

The service channel is configured to provide service of a message push protocol. The service channel is bound with a service unit through a communication interface. A status of the channel, a message push message format, data statistics, etc. are encapsulated in the service channel and provided in the form of representational state transfer (REST) service.

Step 102: pushing the target message to the target terminals according to the channel identifier.

In some embodiments, pushing the target message to the target terminal according to the channel identifier, includes: querying a communication interface corresponding to the service channel according to the channel identifier, where the communication interface is a message transmission path established when a binding relationship is established between the service channel and the service unit; and pushing the target message to the target terminals through the communication interface.

In other words, the binding relationship between the service channel and the service unit may be established in advance, and the message transmission path between the service unit and the service channel may be established through the communication interface when establishing the binding relationship. After obtaining the message push request, the communication interface corresponding to the service channel can be queried in the binding relationship between the service channel and the service unit according to the channel identifier.

Specifically, the server receives the message push request sent by the background server, and then the server parses the message push request to obtain the message identifier of the to-be-pushed target message, the terminal identifier of the target terminal for receiving the target message, and the channel identifier of the service channel for pushing the target message. The server queries the communication interface corresponding to the service channel in the binding relationship between the service channel and the service unit according to the channel identifier, and pushes the target message to the target terminal through the communication interface obtained by the query.

Therefore, in the embodiment of the present application, after receiving the message push request, the target message can be pushed to the target terminal according to the pre-established binding relationship between the service channel and the service unit. In the present application, a variety of message push protocol services are encapsulated in the server in advance. After binding the service unit with the corresponding service channel, users can directly implement message push through the message push request, which effectively improves compatibility of message push and can meet diverse message push needs of different users.

Figure 3:
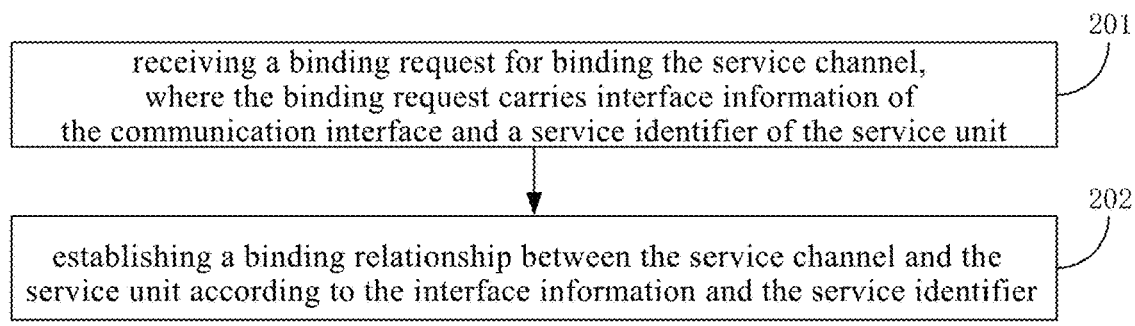
FIG. 3 is a flowchart of another message push method according to an embodiment of the present application.

In the embodiment of the present application, as shown in FIG. 3, before receiving the message push request, the method further includes:

Step 201: receiving a binding request for binding the service channel, where the binding request carries interface information of the communication interface and a service identifier of the service unit.

Step 202: establishing a binding relationship between the service channel and the service unit according to the interface information and the service identifier.

Specifically, before the background server sends the message push request to the server, the background server first sends the binding request to the server. The background server monitors the electronic device to obtain the interface information of the communication interface used for service channel binding and the service identifier of the service unit, and then generates the binding request according to the interface information and the service identifier. The background server sends the binding request to the server, so that the server can establish a binding relationship between the service channel and the service unit according to the interface information and the service identifier in the binding request.

Therefore, in the present application, service channels bound to the service unit are expanded through the binding request, thereby increasing expansion capability of the server for message push, without the need for users to perform secondary development, it is only needed to enter the corresponding binding request to increase the message push protocol service.

It should be noted that the interface information of the communication interface for service channel binding may be obtained in advance according to the following methods, and then provided to the user through the interactive interface of the electronic device, so that the user can describe the binding request according to the interface information provided in the interactive interface.

Optionally, the channel identifier of the service channel and configuration information corresponding to the channel identifier are obtained, then an interface framework of the service channel is generated according to the channel identifier and configuration information; based on the interface framework, the interface information corresponding to the service channel is configured.

The channel identifier may include a type and a provider of the channel, for example, Alibaba cloud SMS push service channel, 163 mailbox push service channel, etc. In order to obtain the configuration information corresponding to the channel identifier, the configuration information such as server component and gateway template of the service channel may be obtained by consulting an access specification of the relevant service channel.

A scaffolding tool may be used to generate the interface frame of the service channel according to the channel identifier and configuration information, and the obtained interface frame contains complete functional information of the same type of channel, for example:

a. unified HTTP external service: manage external service capabilities of the system and API integration interface;

b. diversity of channel docking protocols: diversity of user needs and diversity of third-party platforms require channel access to have access capability of multiple protocols;

c. non-functional requirements such as unified deployment and dependency: unified definition of dependency definition documents of system libraries, system automation scripts, compilation scripts, etc.;

d. Swagger UI: unified interface testing UI, which is convenient for quick testing and functional verification;

f. version management: manage versions of access platforms, version of the system itself, dependent version of compilation environment, etc.;

g. description documents: including architecture description documents, API description documents, operation manuals, etc.;

h. API: general API interface, such as:

(1) registration: template, server address information, identity information, etc. registered with Broker;

(2) channel status: basic attribute information of the channel, ID, type, version, address, maintenance personnel information, start time, release message interface, platform registration interface, compilation information, etc.;

(3) message push: receive a message pushed by an access party, check the validity, and then push it to the target terminal;

(4) statistical analysis: uniformly encapsulate statistical information of platforms connected to the channel, and then synchronize the access party;

(5) health check: used to detect whether the channel service is online and whether it is running abnormally;

(6) system monitoring: support mainstream prometheus monitoring, able to directly access the monitoring platform.

It should be noted that the above contents are contents of a public module of an interface of the service channel. In other words, when establishing a binding relationship between the service channel and the server, it is also necessary to perform necessary conversion in the API part to encapsulate the platform or service that is connected, and open up the entire business flow. The contents of the public module may be stored in the server Broker. When the binding relationship between the service unit and the service channel needs to be established, information of the public module can be called and individually transformed according to corresponding service channel information.

Specifically, after obtaining the channel identifier and configuration information of the service channel, necessary parameters for generating the service channel are input into the scaffolding tool (which is a tool for automatically creating project basic files, such as creating project infrastructure, providing project specifications and conventions), and the interface framework of the service channel is generated. The interface framework includes the public module of the service channel, and then the final interface information of the service channel can be obtained by the interface framework through fine-tuning. The interactive interface of the electronic device performs interface bootstrapping by displaying interface information. The interface bootstrapping is that interface parameters of the channel interface are displayed on the interactive interface. Optionally, individually interface parameters of the interface are displayed on the interactive interface. The interface bootstrapping may adopt the JSON structure.

One example is as follow:

The unified interface information may be abstracted as:

```
type Channel Service interface{
    Status( ) string
    Metrics( )
    Register( ) string
    Statistics( ) string
    Publish(string) error
    Keepalive( ) error
}
```

Therefore, the present application solves the problem of service channel expansion and single protocol by defining the interface when binding service channels with service units, and also solves the problem of inconsistent message formats of different service channels. Further, when the user's message push service volume is large, the server will usually dynamically add and configure corresponding service units to increase the parallel processing capability. At this point, there are multiple options for binding extended service channels.

Figure 4:
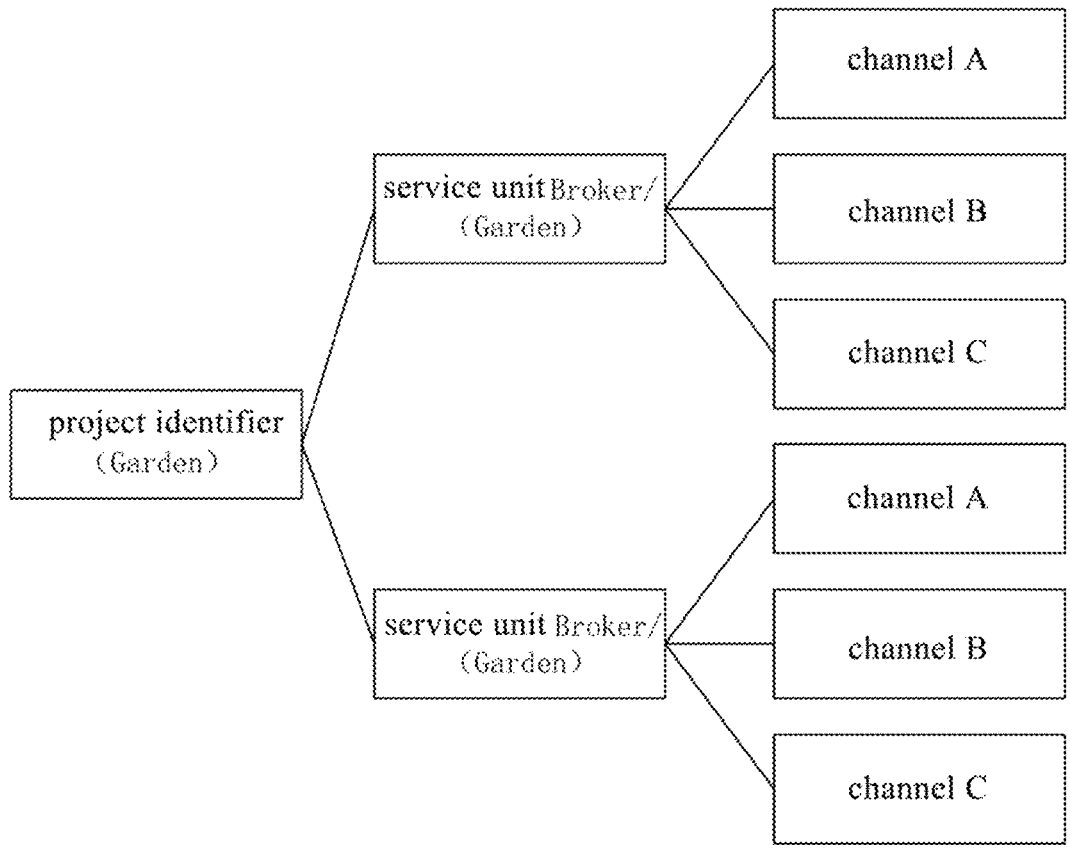
FIG. 4 is a schematic diagram showing connection relationship between a service channel and a service unit according to an embodiment of the present application.

In some embodiments, the service identifier includes a project identifier, and the service channel establishes a binding relationship with each service unit. As shown in FIG. 4, the establishing a binding relationship between the service channel and the service unit according to the interface information and the service identifier, includes: querying and obtaining at least one service unit that matches the

```
"53FD23A008B3A80449775233C103939E": {
    "name": "sms",
    "addr": "10084.greea684.l3me9dx2.956eed.grapps.cn",
    "Port": "10084",
    "manu": 1,
    "email": dxxxxxxxxxxx@boe.com.cn,
    "phone": "177XXXXXXXXX",
    "token": "admin@123456",
    "status": true,
        "swagger":"http://10085.greea684.l3me9dx2.956eed.grapps.cn/swagger/index.html"
    "version": "develop-1.0.0.273f5fe",
    "running": "193h40m49.705078254s",
    "publish": {
        "params": "{\"code\": \"453456\"}",
        "tag": "Test",
        "to": [
            "177XXXXXXXXX"
        ]
    }
    "register": {
        "domain": "dysmsapi.aliyuncs.com",
        "key": "LTAI4G4dXiWRb2YNKseEoqjs",
        "secret": "P7wN33JSGucOENevJSDy3Q1bSB2Eia",
        "signName": "smart park",
        "template": "SMS_205894470",
        "zone": "zh_beijing",
    },
    "buildTime": "2021-01-28 01: 55: 33",
    "developer": "dxxxxxxxxxxx",
"goVersion": "go version go1.14.7 linux/amd64"
},
```

Optionally, the binding request may further include a customized service channel access specification, which may be in JSON format and mainly include the following interface definitions:
1. Status (/status): data interface format definition of the channel's own status data and push message;
2. Push (/push): message push interface;
3. Statistics (/statistics): push result data statistics;
4. Query (/config): issue configuration query;

project identifier from a service unit list according to the project identifier; for each service unit, establishing a message transmission channel between the service channel and the service unit through the interface information, thereby establishing the binding relationship between the service channel and the service unit.

The project identifier may a name of a message push rule set by the user, such as a park project, a bank project, a city project.

Specifically, the server provides multiple service unit services for the project identifier. At this point, in order to improve concurrent capacity of the service units, the service unit list may be obtained from the server, then at least one service unit that matches the project identifier can be obtained by querying the service unit list according to the project identifier, and then the corresponding service channel in the binding request is respectively bound with each queried service unit through the interface information, and a message transmission channel is established.

Optionally, when performing message push, after receiving the message push request, the server may randomly send the message push request to any one of the multiple service units that match the project identifier. When the push message business volume is large, terminal identifiers carried in the message push request may be sent to multiple service units according to a preset ratio, so that the multiple service units can simultaneously push messages, thereby improving efficiency of message push.

Optionally, in the embodiment of the present application, when each service unit is configured, each service unit is bound to an online service channel, i.e., MQTT cluster channel, to send a target message to online terminal devices, thereby effectively improving an efficiency of pushing the target message and ensuring that the online terminal devices receive the target message in time.

That is, after receiving the message push request, the service unit first determines whether a target terminal is an online device according to a terminal identifier of the target terminal. For example, the service unit may communicate with an application installed in the target terminal to determine whether the target terminal is online. If the target terminal is online, the target message is pushed to the target terminal through the MQTT cluster channel. If the target terminal is offline, the target message is pushed to the target terminal according to the channel identifier carried in the message push request. Optionally, the MQTT cluster channel may also have a corresponding channel identifier, and the push message request may include both of the channel identifier of the MQTT cluster channel and the channel identifier of at least one offline service channel. The offline service channel includes an X system channel, Y system channel, and Z system channel shown in FIG. 6. The X system channel, Y system channel, and Z system channel may be vendor service channels, SMS channels, mail channels.

Therefore, the present application can provide users with more choices of message push methods by setting up multiple channels. For example, the mail channel may be selected for message push during working hours, which is convenient for enterprise users to push messages to employees. The SMS channel may be selected for message push during off hours, which can further ensure a reception rate of message push. For product promotion companies, MQTT channels and vendor channels may be selected to ensure that messages can be received by users related to the company.

Figure 5:
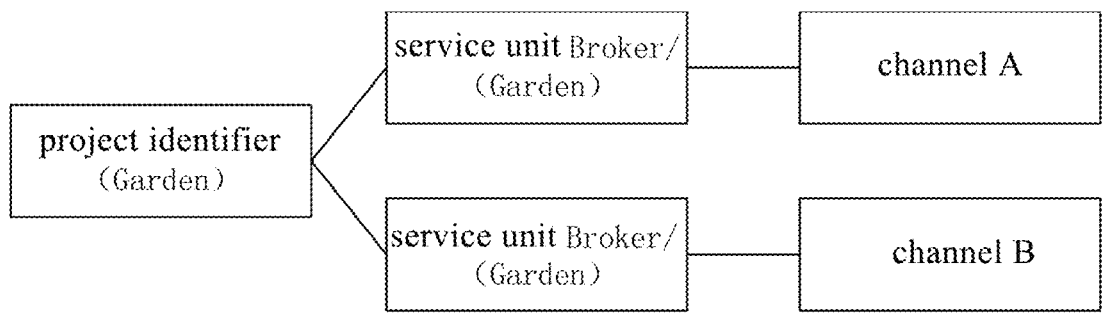
FIG. 5 is a schematic diagram showing another connection relationship between a service channel and a service unit according to an embodiment of the present application.

In some other embodiments, the service identifier includes a project identifier, and the service channel establishes a binding relationship with any service unit. As shown in FIG. 5, the establishing a binding relationship between the service channel and the service unit according to the interface information and the service identifier, includes: querying and obtaining at least one service unit that matches the project identifier from a service unit list according to the project identifier; identifying a first service unit that has not established a binding relationship from the at least one service unit, establishing a message transmission channel between the service channel and the first service unit through the interface information, thereby establishing the binding relationship between the service channel and the first service unit.

The project identifier may a name of a message push rule set by the user, such as a park project, a bank project, a city project.

Specifically, the server provides multiple service unit services for the project identifier. At this point, in order to improve concurrent capacity of the service units, the service unit list may be obtained from the server, then at least one service unit that matches the project identifier can be obtained by querying the service unit list according to the project identifier, and then the first service unit that has not established a binding relationship is identified from the at least one service unit. At this point, it is determined that the first service unit is a new service unit established by the server in response to the binding request. Through the interface information, the corresponding service channel in the binding request is bound with the queried first service unit that has not established a binding relationship, and a message transmission channel is established.

Optionally, when performing message push, after receiving the message push request, the server can classify terminal identifiers according to channel identifiers of the service channels, and then send the terminal identifiers to the service units corresponding to the channel identifiers according to classification results, so that multiple service units can simultaneously push messages that execute multiple different protocols, thereby improving the efficiency of message push.

Specifically, the push request further includes a project identifier. The querying the communication interface corresponding to the service channel according to the channel identifier, includes: querying second service units that match the project identifier from the service unit list according to the project identifier; obtaining first channel identifiers of service channels that have binding relationship with the second service units; querying a first service channel matching the channel identifier from the first channel identifiers; and obtaining a communication interface corresponding to the first service channel.

That is, after the server receives the message push request, the server parses the message push request to obtain the project identifier of a current message push task, and then queries the second service units that match the project identifier from the service unit list in the server according to the project identifier. Each second service unit serves the current project identifier and can perform the message push task issued by the project. Then, the server obtains the first channel identifiers of service channels that have binding relationship with the second service units, queries the first service channel matching the channel identifier in the message push request from the first channel identifiers, and obtains the communication interface corresponding to the first service channel.

It should be understood that when the service channel is bound to the service unit according to types, that is, when one service unit is bound to one service channel, the only one communication interface that can execute the message push request can be directly obtained through the above steps, and the message can be pushed directly through the communication interface.

Optionally, when there is a binding relationship between the service channel and each service unit, the pushing the target message to the target terminal through the communication interface, includes: obtaining a message push task inventory of each second service unit, and sending the message push request to the second service unit with the smallest message push task inventory, thereby pushing the target message to the target terminal through a communication interface corresponding to the service channel bound to the second service unit with the smallest message push task inventory.

In other words, when the binding relationship between multiple service units and service channels is the same, the multiple service units are in a parallel state. At this point, the message push task inventory, i.e., unfinished message push task, of each service unit can be obtained. Then, the message push request is sent to the service unit with the smallest message push task inventory, so that the service unit with the smallest message push task inventory can perform the current message push task as soon as possible after completing the message push task inventory, which effectively improves the efficiency of message push and avoids accumulation of message push tasks, and solving the problem of the long time consumed by the message push.

Furthermore, the server of the present application further stores a target message queue. The pushing the target message to the target terminal through the communication interface, includes: extracting to-be-pushed message data from the stored message queue according to the message identifier; when push time is reached, identifying validity of the message data; if the message data is valid, pushing the target message to the target terminals through the communication interface; and if the message data is invalid, deleting the message data from the message queue.

Figure 6:
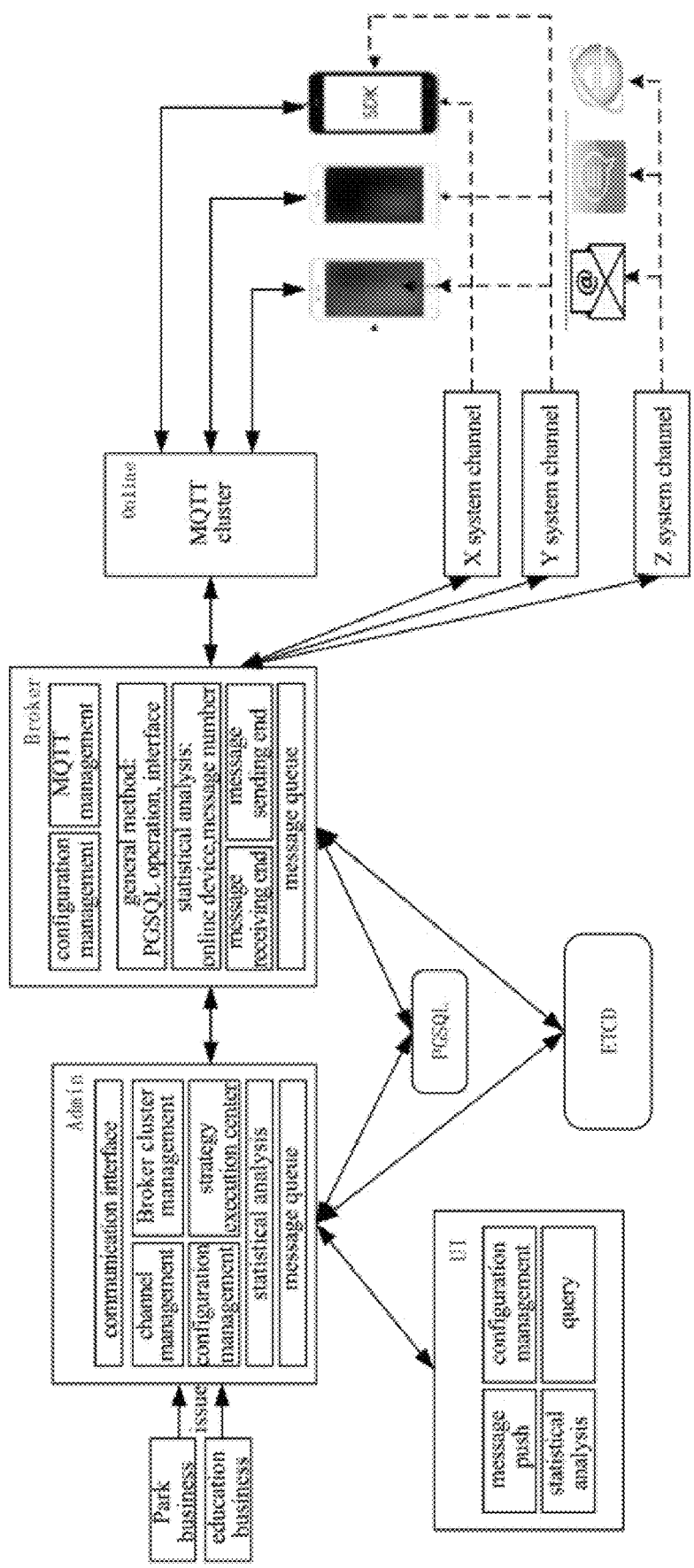
FIG. 6 is a schematic diagram showing a principle of a message push method according to an embodiment of the present application.

As shown in FIG. 6, in the message push framework, the user can add message data to the message queue at any time. Optionally, the message data may be message content that is used repeatedly. When performing message push, the to-be-pushed message data can be extracted from the message queue according to the message identifier in the message push request, thereby eliminating the need for the user to re-enter the message data each time the message is pushed, effectively reducing the complexity when the user performs message push.

Specifically, when the message data is pushed for the first time, the message data may be stored in the message queue and assigned with corresponding message identifiers, for example, message labels such as Message1, Message2. Then, when the message data needs to be used later, the user can configure the message push request according to message identifiers and push time. The message push time may be 0 s in an instant push task. The message push time may be set according to an appointment time in a timing task; after receiving the message push request, the server starts timing and extracts to-be-pushed message data from the stored message queue; when the timing time reaches the push time, the server identifies the validity of the message data. If the message data is valid, the server pushes the target message to the target terminal through the communication interface. If the message data is invalid, the server deletes the message data from the message queue, and feeds back a reminder message of message invalidity to the background server.

In this way, the present application can ensure validity of message data pushed by a message push task, thereby avoiding pushing invalid information to the terminal, which brings a poor reading experience to the user.

Figure 7:
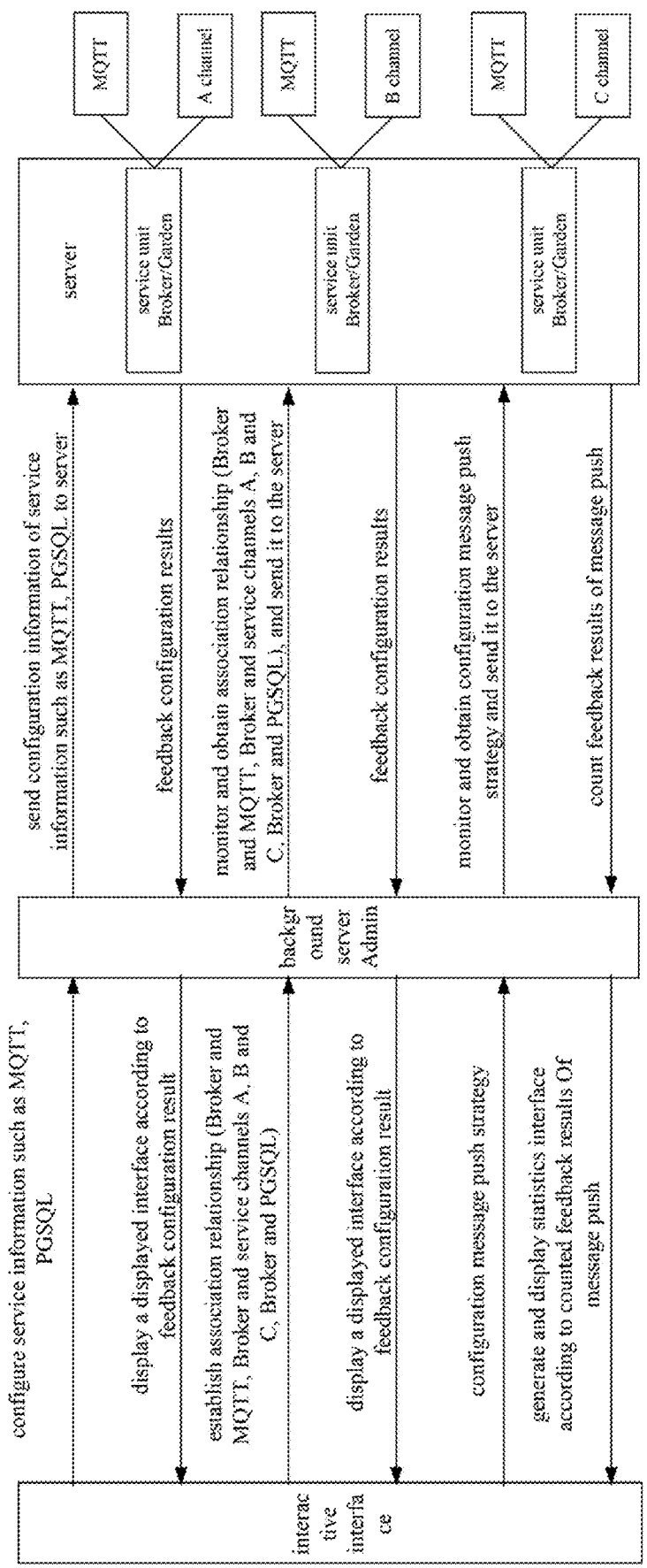
FIG. 7 is a signaling interaction diagram of a message push method according to an embodiment of the present application.
Figure 8:
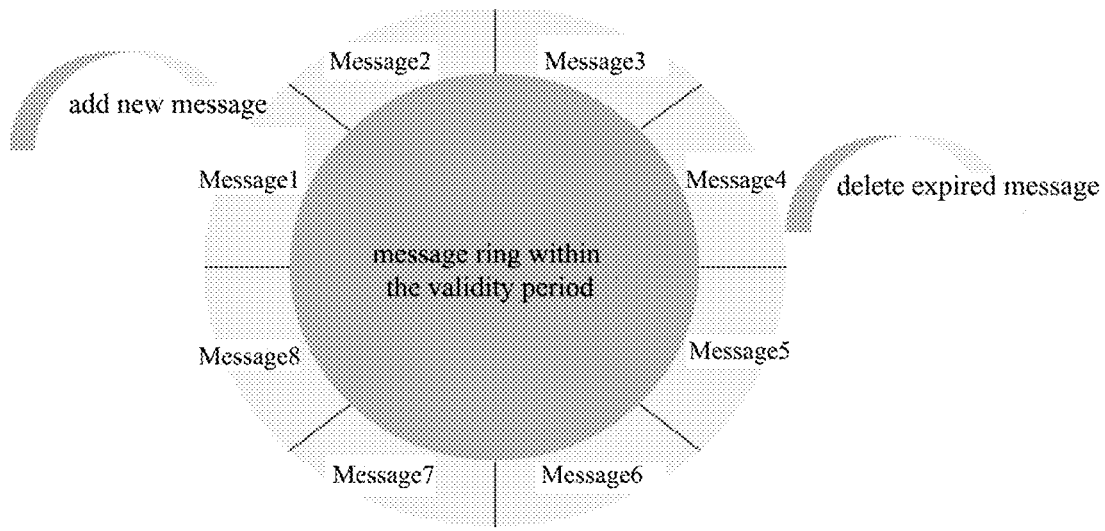
FIG. 8 is a schematic diagram showing a processing principle of message data according to an embodiment of the present application.

The technical solution of the present application will be described in detail hereinafter with reference to FIG. 6 to FIG. 8.

A user configures a project name through an interactive interface (UI) provided by an electronic device, such as Garden, online service channel MQTT, and data storage unit PGSQL, and binds configuration information with a service unit Broker named Garden, thereby establishing a framework of a message push project. Data source of the interactive interface is provided by a background server Admin. The configuration information set by the user through the interactive interface is stored in the data storage unit PGSQL and/or Broker in the form of dictionary structure data for caching. Meanwhile, an independent coroutine is started to establish heartbeat connection with each configuration server.

Specifically, the background server Admin calls a configuration interface for message push and displays it on a display device. The user uses a keyboard, a mouse or touch operation to input content information that needs to be configured, such as a project name, on the displayed interface. The background server monitors the content input on the displayed interface to obtain the user's configuration information of the project name, and then sends the project name to the server. The server receives the project name, and queries whether there is a service unit that is currently configured to match the project name. If there is a service unit that is currently configured to match the project name, the server continues to receive other information sent from the background server. If there is not a service unit that is currently configured to match the project name, the server configures at least one service unit that matches the project name. For example, when one service unit is established, the service unit may be Garden; when two service units are established, the two service units are Garden1 and Garden2. A binding relationship exists between the service unit and the project name, and the bound service unit is used to execute a message push request sent by the project to which the bound service is bound.

It should be understood that when the background server Admin monitors that the user configures a new project name on the displayed interface, the background server Admin also sends the configured project name to ETCD for registration. ETCD is a reliable distributed KV storage, and its bottom layer uses Raft algorithms to ensure consistency, which is mainly used for shared configuration and service discovery, that is, the newly created project name is registered in ETCD. Correspondingly, after the server configures a service unit corresponding to the project name, the service unit also sends information of the service unit to ETCD for registration, so that ETCD binds the server Admin and the service unit Broker according to the project name.

Further, the user may also configure a data storage unit (for example, PGSQL) on the display device. The data storage unit is used to store message push results, terminal registration information, and push message information, such as backup and storage of sent messages, management of user identity information and authority information, configuration information of the online service channel MQTT configured by the user through the displayed interface, storage of statistical analysis data fed back by the server to the background server, and operation records sent by the background server to the server.

Furthermore, the user continues to configure interface information of the service channel through the interactive interface. The background server generates a binding request based on the interface information and sends the binding request to the server, so that the server binds the service channel to the service unit named Garden according to the interface information. The service channels may include, but are not limited to, Huawei channel, Xiaomi channel, Apple channel, mail channel, SMS channel, Web channel, Android channel, etc.

Package services of each service channel is registered with the background server Admin, that is, the interface information of the service channel used to bound to the service unit is sent to the background server Admin, so that the user can bind the service unit with the service channel according to needs, and binds the service unit Broker with the GRPC protocol. The service channel waits for a message sent from the service unit; and after receiving the message, the service channel sends the message to the target terminal according to preset rules.

It should be understood that the service channels may further include service platforms, such as mail, HTTPS/HTTP, short messages, etc. Each service channel provides services independently and actively registers with ETCD.

Specifically, as shown in FIG. 6, the service unit Broker includes multiple function modules, including a configuration management module, an MQTT management module, a general method module, a statistical analysis module, a message receiving end, a message sending end, and a message queue module. The message queue module receives message data through the message receiving end (independent thread), checks validity of the message data and stores it in the message queue, so that the message sending end can push the message data to the target terminal when performing message push. The configuration management module is configured to maintain channel binding relationship issued by the background server, and maintain heartbeat detection of service channels. The MQTT management module is configured to detect status of online devices, etc. The statistical analysis module is configured to count pushed message data, the number of cached messages, the number of online terminals, the number of offline terminals, bound service channel data, system resource occupancy, etc. The general method module is configured to encapsulate some general methods, for example, a method of sending stored data to PGSQL, a method of connecting with the service channel, a method of heartbeat detection, a method of connecting with MQTT, and an external debugging interface.

After the user configures a project framework for message push, the service unit collects registration information, heartbeat information and real-time message receipts of online services from the online service channel MQTT and performs statistics. The statistical information of the service unit may include but is not limited to the following:

1. the number of terminals counted from dimensions of manufacturer, online status, platform type, terminal type, etc.;
2. the maximum and minimum time-consuming time of message push, a total number of messages, message data currently being pushed, the number of expired messages, the number of cached messages, etc.;
3. the number of service channels, the number of service channels bound under a project name and the number of parallel service units, etc.;
4. online duration of service units corresponding to each project identifier, the number of projects and the total number of message push requests, etc.

It should be understood that the information counted by the server may be sent to the background server at a preset frequency, so that the server generates a statistical interface based on the statistics and displays it to the user, and then the user can understand execution status of the message push task.

When the user needs to perform message push, the user logs in to the message push system through an electronic device, and then configures conditions for pushing messages on the interactive interface, such as a message identifier of a to-be-pushed target message, terminal identifiers of target terminals for receiving the target message, and channel identifiers of service channels for pushing the target message. It should be understood that the interactive interface can provide labels of necessary conditions for performing message push, and the user can enter corresponding information in corresponding control according to prompts of the labels to complete configuration of message push request. The background server monitors the interactive interface provided by the electronic device, obtains the configured information of message push and generates a message push request. The background server sends the message push request to the server. Meanwhile, the background server also sends the message push request to the data storage unit PGSQL for backup.

After the server receives the message push request sent by the background server, the server parses the message push request, first extracts the to-be-pushed message data from the message queue for storing messages according to the message identifier, and then identifies validity of message data when the push time is reached. If the message data is valid, the server pushes the target message to the target terminals through the communication interface. If the message data is invalid, the server deletes the message data from the message queue.

The server further sends to-be-sent message data, terminal identifiers and channel identifiers to the corresponding service units according to binding status of service units and service channels. Then, each service unit first queries online terminals according to the terminal identifiers, and sends the message data to the online target terminals through the online service channel MQTT; and then, for offline target terminals, each service unit pushes the message data to the offline target terminals through the communication interfaces according to manufacturers and terminal types of the target terminals.

Optionally, in this embodiment of the present application, it is necessary to ensure that messages cannot be pushed repeatedly to any target terminal when pushing messages. For example, one target terminal is online state in an early stage of message push and then switches to an offline state, only one message push can be made to the one target terminal, thereby avoiding repeated message push when the one target terminal is in online and offline states.

After the service unit pushes the message to the target terminals, the service unit further counts a message push result, and the server sends a statistical push result to the background server at a preset frequency, so that the background server generates and displays the statistics interface.

Further, if the user needs to add a new message push, for example, the user does not establish an Apple channel when establishing the message push framework and the Apple channel needs to be added at this time, the user can configure, through the display interface, interface information for the Apple channel and information of service units for binding the Apple channel. The background server generates a binding request based on the interface information and the information of service units, and sends the binding request to the server for adding service units bound to the Apple channel, so that messages can be pushed to mobile terminals produced by the Apple manufacturer according to the Apple channel.

As a specific embodiment, after the user completes configurations of the service unit Broker and service channels (which include MQTT clusters, Huawei channels, and SMS channels), when there is a need for message push, the user configures an identifier of to-be-pushed target message, target terminal identifiers (which may reflect that the target terminals belongs to the Huawei brand) in the interactive interface, and configures service channels for message push.

If a push mode configured by the user is to push only through a target application APP, the service unit Broker selects a message push mode according to online information of target terminals collected by the MQTT cluster service:
(1) if the target application APP installed on the target terminal is online, using the MQTT cluster channel to push the target message to the target terminal;
(2) if the target application APP installed on the target terminal is offline, obtaining an application ID of the target application in an app store of the manufacturer to which the target terminal belongs, such as an application ID of the target application APP registered in the HUAWEI app store; then, using the Huawei channel to wake up the target application APP through the application ID, and sending the target message to the target terminal, or directly using the Huawei channel to send the target message to the target terminal as an offline message.

If the push mode configured by the user includes two modes including the target application APP and SMS, the service unit Broker selects the message push mode according to the online information of the target terminals collected by the MQTT cluster service:
(1) if the target application APP installed on the target terminal is online, using the MQTT cluster channel to push the target message to the target terminal;
(2) if the target application APP installed on the target terminal is offline, using the SMS channel to push the target message to the target terminal.

If the push mode configured by the user includes an SMS channel, the target message is directly pushed to the target terminal through the SMS channel.

If the push modes configured by the user includes Huawei channel and SMS channel, the service unit Broker determines whether the target terminal belongs to the Huawei manufacturer based on the target terminal identifier. If the target terminal belongs to the Huawei manufacturer, the service unit Broker further determines, according to the MQTT cluster service, whether the target terminal has installed the target application APP. If the target terminal has installed the target application APP, the target message is pushed to the target terminal through the Huawei channel. If the target terminal has not installed the target application APP, the target message is pushed to the target terminal through the SMS channel.

It should be noted that ways in which the target terminal is capable of receiving target messages may be configured in form of a database table through the interactive interface. In summary, in the embodiment of the present application, after receiving the message push request, the target message can be pushed to the target terminals according to the pre-established binding relationship between the service channel and the service unit. In the present application, a variety of message push protocol services are encapsulated in the server in advance. After the user binds the service unit to the corresponding service channel, the user can directly implement message push through the message push request, which effectively improves compatibility of message push and can meet diverse message push needs of different users.

Figure 9:
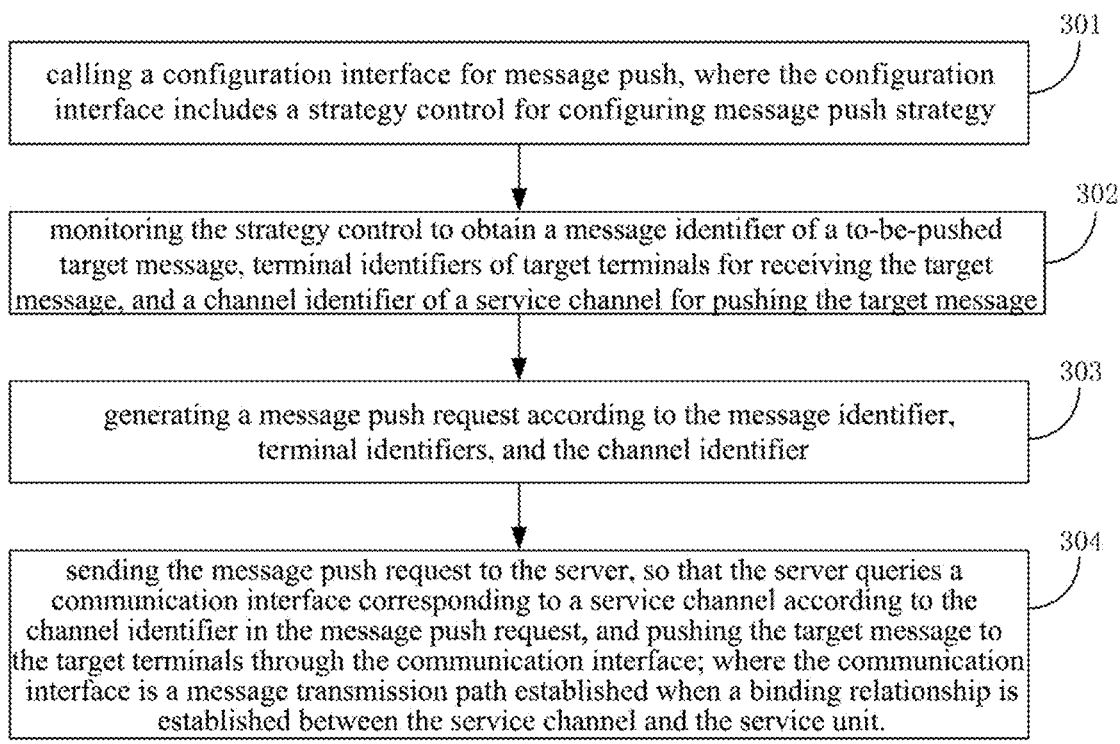
FIG. 9 is a flowchart of a message push method performed by a background server according to an embodiment of the present application.

FIG. 9 is a flowchart of a message push method according to an embodiment of the present application. It should be noted that an execution entity of the message push method in this embodiment is a message push apparatus, and the message push apparatus may be implemented by software and/or hardware. The message push apparatus in this embodiment may be configured in an electronic device, or configured in a background server for controlling the electronic device. The background server communicates with the electronic device to control the electronic device.

As shown in FIG. 9, a message push method provided in an embodiment of the present application includes the following steps.

Step 301: calling a configuration interface for message push, where the configuration interface includes a strategy control for configuring message push strategy.

Step 302: monitoring the strategy control to obtain a message identifier of a to-be-pushed target message, terminal identifiers of target terminals for receiving the target message, and a channel identifier of a service channel for pushing the target message.

Step 303: generating a message push request according to the message identifier, terminal identifiers, and the channel identifier.

Step 304: sending the message push request to the server, so that the server queries a communication interface corresponding to a service channel according to the channel identifier in the message push request, and pushing the target message to the target terminals through the communication interface; where the communication interface is a message transmission path established when a binding relationship is established between the service channel and the service unit.

In some embodiments, the configuration interface further includes a binding control of the service channel, the server includes at least one service unit, and the method further includes: monitoring the binding control to obtain interface information of the communication interface and a service identifier of the service unit; generating a binding request according to the interface information and the service identifier; sending the binding request to the server, so that the server establishes the binding relationship between the service channel and the service unit according to the binding request.

In some embodiments, the method further includes receiving statistical information sent by the server, where the statistical information is generated by the server according to push results of the target information; when receiving a statistical query instruction, generating and displaying a statistical information display interface according to the statistical information.

It should be noted that, details that are not disclosed in the message push method of this embodiment of the present application, may refer to the details disclosed in the foregoing embodiment of the present application, and will not be repeated here.

In summary, in the embodiment of the present application, after receiving the message push request, the target message can be pushed to the target terminals according to the pre-established binding relationship between the service channel and the service unit. In the present application, a variety of message push protocol services are encapsulated in the server in advance. After the user binds the service unit to the corresponding service channel, the user can directly implement message push through the message push request, which effectively improves compatibility of message push and can meet diverse message push needs of different users.

Figure 10:
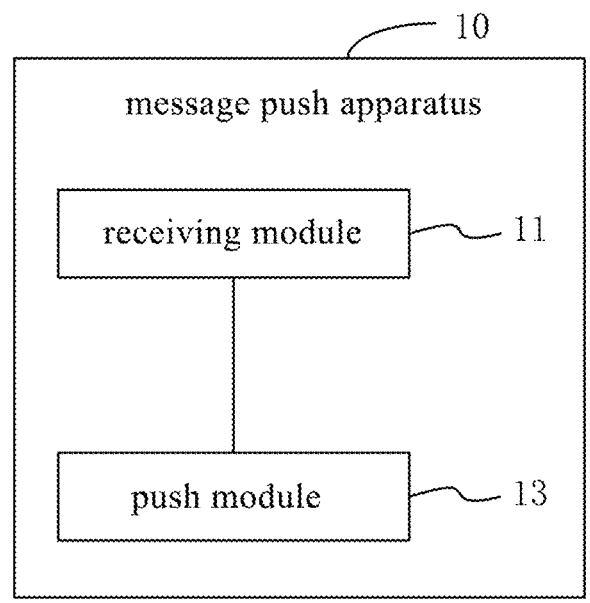
FIG. 10 is a schematic diagram of a message push apparatus applied in a server according to an embodiment of the present application.

FIG. 10 is a schematic diagram of a message push apparatus according to an embodiment of the present application. It should be noted that the message push apparatus of the embodiment of the present application is configured in a server, and the server communicates with a background server to receive a request sent by the background server and feed back a statistical result to the background server.

As shown in FIG. 10, the message push apparatus 10 of the embodiment of the present application includes:
- a receiving module 11 configured to receive a message push request, where the message push request carries a message identifier of a to-be-pushed target message, terminal identifiers of target terminals for receiving the target message, and a channel identifier of a service channel for pushing the target message;
- a push module 13 configured to push the target message to the target terminal according to the channel identifier.

In some embodiments, the message push apparatus 10 further includes a query module, configured to query a communication interface corresponding to the service channel according to the channel identifier, where the communication interface is a message transmission path established when a binding relationship is established between the service channel and the service unit.

The push module 13 is configured to push the target message to the target terminal through the communication interface.

In some embodiments, the push module 13 is further configured to,
- extract to-be-pushed message data from the stored message queue according to the message identifier;
- when push time is reached, identify validity of the message data;
- if the message data is valid, push the target message to the target terminal through the communication interface; and
- if the message data is invalid, delete the message data from the message queue.

In some embodiments, the receiving module 11 is further configured to,
- receive a binding request for binding the service channel, where the binding request carries interface information of the communication interface and a service identifier of the service unit;
- establish a binding relationship between the service channel and the service unit according to the interface information and the service identifier.

In some embodiments, the service identifier includes a project identifier, and the service channel establishes a binding relationship with each service unit. The receiving module 11 is further configured to,
- query and obtain at least one service unit that matches the project identifier from a service unit list according to the project identifier;
- for each service unit, establish a message transmission channel between the service channel and the service unit through the interface information, thereby establishing the binding relationship between the service channel and the service unit.

In some other embodiments, the service identifier includes a project identifier, and the service channel establishes a binding relationship with any service unit. The receiving module 11 is further configured to,
- query and obtain at least one service unit that matches the project identifier from a service unit list according to the project identifier;
- identify a first service unit that has not established a binding relationship from the at least one service unit;
- establish a message transmission channel between the service channel and the first service unit through the interface information, thereby establishing the binding relationship between the service channel and the first service unit.

In some embodiments, the query module is further configured to,
- query second service units that match the project identifier from the service unit list according to the project identifier;
- obtain first channel identifiers of service channels that have binding relationship with the second service units;
- query a first service channel matching the channel identifier from the first channel identifiers; and
- obtain a communication interface corresponding to the first service channel.

In some embodiments, when there is a binding relationship between the service channel and each service unit, the push module 13 is further configured to,
- obtain a message push task inventory of each second service unit, and
- send the message push request to the second service unit with the smallest message push task inventory, thereby pushing the target message to the target terminal through a communication interface corresponding to the service channel bound to the second service unit with the smallest message push task inventory.

It should be noted that, details that are not disclosed in the message push apparatus of the embodiment of the present application, may refer to the details disclosed in the foregoing embodiment of the present application, and will not be repeated here.

It should be understood that units or modules recorded in the message push apparatus 10 are corresponding to the steps in the method described with reference to FIG. 2. Therefore, the operations and features described above for the method are also applicable to the message push apparatus 10 and the modules contained therein, and will not be repeated here. The message push apparatus 10 may be implemented in a browser or other security application of an electronic device in advance, or it may be loaded into the browser or other security application of the electronic device by downloading or the like. Corresponding modules in the message push apparatus 10 can cooperate with modules in the electronic device to implement the solutions of the embodiments of the present application.

For the several modules or units mentioned above in the detailed description, such division is not mandatory. In fact, according to the embodiments of the present disclosure, the features and functions of two or more modules or units described above may be embodied in one module or unit. Conversely, the features and functions of one module or unit described above may be further divided into multiple modules or units.

In summary, in the embodiment of the present application, after receiving the message push request, the target message can be pushed to the target terminals according to the pre-established binding relationship between the service channel and the service unit. In the present application, a variety of message push protocol services are encapsulated in the server in advance. After the user binds the service unit to the corresponding service channel, the user can directly implement message push through the message push request, which effectively improves compatibility of message push and can meet diverse message push needs of different users.

Figure 11:
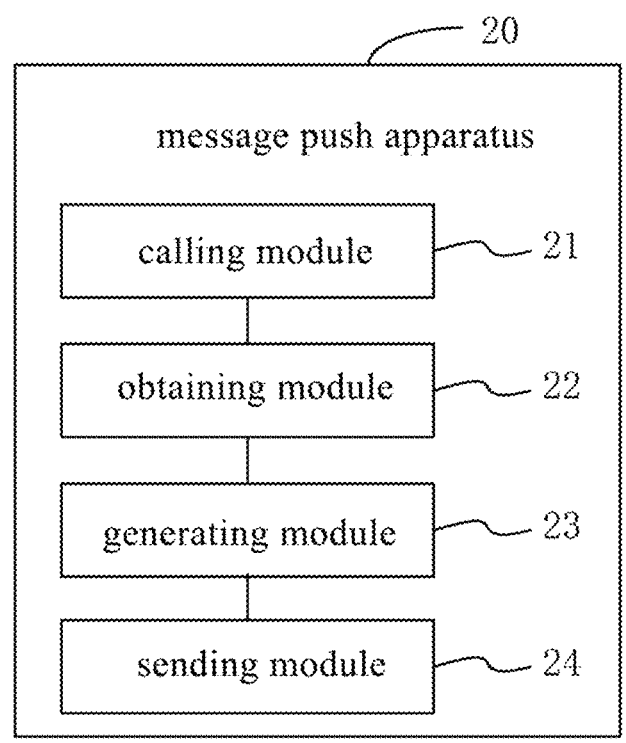
FIG. 11 is a schematic diagram of a message push apparatus applied in a background server according to an embodiment of the present application.

FIG. 11 is a schematic diagram of a message push apparatus according to an embodiment of the present application. It should be noted that the message push apparatus in this embodiment is configured in a background server and the background server communicates with an electronic device to control the electronic device.

As shown in FIG. 11, the message push apparatus 20 of the embodiment of the present application includes:

a calling module 21 configured to call a configuration interface for message push, where the configuration interface includes a strategy control for configuring message push strategy;

an obtaining module 22 configured to monitor the strategy control to obtain a message identifier of a to-be-pushed target message, terminal identifiers of target terminals for receiving the target message, and a channel identifier of a service channel for pushing the target message;

a generating module 23 configured to generate a message push request according to the message identifier, terminal identifiers, and the channel identifier; and a sending module 24 configured to send the message push request to the server, so that the server queries a communication interface corresponding to a service channel according to the channel identifier in the message push request, and pushes the target message to the target terminals through the communication interface; where the communication interface is a message transmission path established when a binding relationship is established between the service channel and the service unit.

In some embodiments, the configuration interface further includes a binding control of the service channel, the server includes at least one service unit.

The obtaining module 22 is further configured to monitor the binding control to obtain interface information of the communication interface and a service identifier of the service unit.

The generating module 23 is further configured to generate a binding request according to the interface information and the service identifier.

The sending module 24 is further configured to send the binding request to the server, so that the server establishes the binding relationship between the service channel and the service unit according to the binding request.

In some embodiments, the calling module 21 is further configured to, receive statistical information sent by the server, where the statistical information is generated by the server according to push results of the target information;

when receiving a statistical query instruction, generate and display a statistical information display interface according to the statistical information.

It should be noted that, details that are not disclosed in the message push apparatus of this embodiment of the present application, may refer to the details disclosed in the foregoing embodiment of the present application, and will not be repeated here.

It should be understood that units or modules recorded in the message push apparatus 20 are corresponding to the steps in the method described with reference to FIG. 2. Therefore, the operations and features described above for the method are also applicable to the message push apparatus 20 and the modules contained therein, and will not be repeated here. The message push apparatus 20 may be implemented in a browser or other security application of an electronic device in advance, or it may be loaded into the browser or other security application of the electronic device by downloading or the like. Corresponding modules in the message push apparatus 20 can cooperate with modules in the electronic device to implement the solutions of the embodiments of the present application.

For the several modules or units mentioned above in the detailed description, such division is not mandatory. In fact, according to the embodiments of the present disclosure, the features and functions of two or more modules or units described above may be embodied in one module or unit. Conversely, the features and functions of one module or unit described above may be further divided into multiple modules or units.

In summary, in the embodiment of the present application, after receiving the message push request, the target message can be pushed to the target terminals according to the pre-established binding relationship between the service channel and the service unit. In the present application, a variety of message push protocol services are encapsulated in the server in advance. After the user binds the service unit to the corresponding service channel, the user can directly implement message push through the message push request, which effectively improves compatibility of message push and can meet diverse message push needs of different users.

Figure 12:
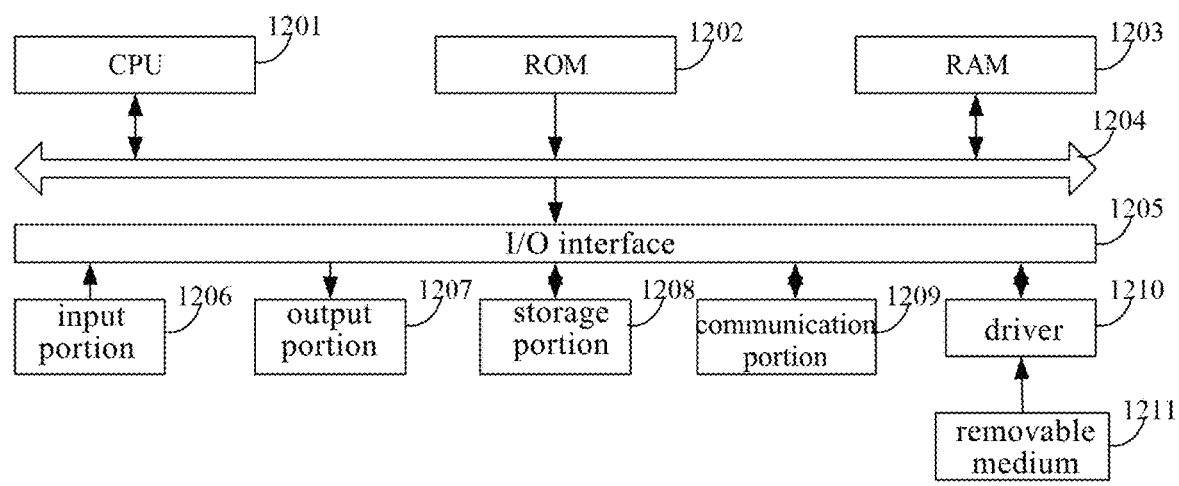
FIG. 12 is a schematic diagram of a computer system suitable for implementing an electronic device or a server according to an embodiment of the present application.

Referring to FIG. 12, FIG. 12 shows a schematic diagram of a computer system suitable for implementing an electronic device or a server according to an embodiment of the present application.

As shown in FIG. 12, the computer system 1200 includes a central processing unit (CPU) 1201, which may execute various appropriate actions and processes in accordance with a program stored in a read-only memory (ROM) 1202 or a program loaded into a random access memory (RAM) 1203 from a storage portion 1208. The RAM 1203 also stores various programs and data required by operations of the system 1200. The CPU 1201, the ROM 1202 and the RAM 1203 are connected to each other through a bus 12704. An input/output (I/O) interface 1205 is also connected to the bus 1204.

The following components are connected to the I/O interface 1205: an input portion 1206 including a keyboard, a mouse etc.; an output portion 1207 including a cathode ray tube (CRT), a liquid crystal display device (LCD), a speaker etc.; a storage portion 1208 including a hard disk and the like; and a communication portion 1209 including a network interface card, such as a LAN card and a modem. The communication portion 1209 performs communication processes via a network, such as the Internet. A driver 1210 is also connected to the I/O interface 1205 as required. A removable medium 1211, such as a magnetic disk, an optical disk, a magneto-optical disk, and a semiconductor memory, may be installed on the driver 1210, to facilitate the retrieval of a computer program from the removable medium 1211, and the installation thereof on the storage portion 1208 as needed.

In particular, according to an embodiment of the present disclosure, the process described above with reference to the flow chart shown in FIG. 2 may be implemented in a computer software program. For example, an embodiment of the present disclosure includes a computer program product, which includes a computer program that is tangibly embedded in a machine-readable medium. The computer program includes program codes for executing the method as illustrated in the flow chart. In such an embodiment, the computer program may be downloaded and installed from a network via the communication portion 1209, and/or may be installed from the removable media 1211. The computer program, when executed by the CPU 1201, implements the functions as defined by the methods of the present disclosure.

It should be noted that the computer-readable medium shown in the present disclosure may be a computer-readable signal medium or a computer-readable storage medium, or any combination of the two. The computer-readable storage medium may be, for example, but not limited to, an electronic, magnetic, optical, electromagnetic, infrared, or semiconductor system, apparatus, or device, or any combination of the above. More specific examples of the computer readable storage medium include but not limited to: an electrical connection with one or more wires, portable computer disk, hard disk, random access memory (RAM), read only memory (ROM), erasable programmable read only memory (EPROM or flash), optical fiber, portable compact disk read only memory (CD-ROM), optical storage device, magnetic storage device, or any suitable combination of the above. In some embodiments of the present disclosure, the computer-readable storage medium may be any tangible medium that contains or stores a program, and the program may be used by or used in connection with a command execution system, apparatus, or device. The computer-readable signal medium may include data signal in the base band or propagating as parts of a carrier, in which computer readable program codes are carried. The propagating data signal may take various forms, including but not limited to: an electromagnetic signal, an optical signal or any suitable combination of the above. The signal medium that can be read by computer may be any computer-readable medium except for the computer readable storage medium. The computer-readable medium is capable of transmitting, propagating or transferring programs for use by, or used in combination with, a command execution system, apparatus or element. The program codes embodied in the computer-readable medium can be transmitted by any suitable medium, including but not limited to: wireless, wire, optic cable, radio frequency (RF), etc., or any suitable combination of the foregoing.

The flowcharts and block diagrams in the figures illustrate architectures, functions and operations that may be implemented according to the system, the method and the computer program product of the various embodiments of the present disclosure. In this regard, each block in the flowcharts and block diagrams may represent a module, a program segment, or a code portion. The module, the program segment, or the code portion includes one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The described units or modules involved in the embodiments of the present application may be implemented in software or hardware. The described unit or module may also be provided in the processor, for example, it may be described as: a processor includes a receiving module, a query module and a push module. Names of these units or modules do not constitute a limitation on the units or modules themselves under certain circumstances. For example, the receiving module may also be described as "a unit for receiving a message push request, where the message push request carries a message identifier of a to-be-pushed target message, a terminal identifier of a target terminal for receiving the target message, and a channel identifier of a service channel for pushing the target message".

In another aspect, the present application further provides a computer-readable storage medium. The computer-readable storage medium may be a computer-readable storage medium included in the electronic device described in the foregoing embodiment, or a stand-alone computer-readable storage medium which has not been assembled into the electronic device. The computer-readable storage medium stores one or more programs. The one or more programs, when executed by one or more processors, cause the one or more processors to implement the message push method of the present application.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

What is claimed is:

1. A message push method, comprising:
receiving a message push request; wherein the message push request carries a message identifier of a to-be-pushed target message, terminal identifiers of target terminals for receiving the target message, and a channel identifier of a service channel for pushing the target message; and
pushing the target message to the target terminals according to the channel identifier;
querying a communication interface corresponding to the service channel according to the channel identifier, wherein the communication interface is a message transmission path established when a binding relationship is established between the service channel and a service unit; and
pushing the target message to the target terminals through the communication interface; wherein
extracting to-be-pushed message data from a stored message queue according to the message identifier;
when push time is reached, identifying validity of the message data;
if the message data is valid, pushing the target message to the target terminals through the communication interface.

2. The method according to claim 1, wherein before the receiving the message push request, the method further includes:
receiving a binding request for binding the service channel, wherein the binding request carries interface information of the communication interface and a service identifier of a service unit;

establishing a binding relationship between the service channel and the service unit according to the interface information and the service identifier.

3. The method according to claim 2, wherein the method further includes:
   obtaining the channel identifier of the service channel and configuration information corresponding to the channel identifier;
   generating an interface framework of the service channel according to the channel identifier and configuration information;
   based on the interface framework, configuring the interface information corresponding to the service channel.

4. The method according to claim 2, wherein the service identifier includes a project identifier, and the service channel establishes a binding relationship with each service unit; the establishing the binding relationship between the service channel and the service unit according to the interface information and the service identifier, includes:
   querying and obtaining at least one service unit that matches the project identifier from a service unit list according to the project identifier;
   for each service unit, establishing a message transmission channel between the service channel and the service unit through the interface information, thereby establishing the binding relationship between the service channel and the service unit.

5. The method according to claim 2, wherein the service identifier includes a project identifier, and the service channel establishes a binding relationship with any service unit; the establishing the binding relationship between the service channel and the service unit according to the interface information and the service identifier, includes:
   querying and obtaining at least one service unit that matches the project identifier from a service unit list according to the project identifier;
   identifying a first service unit that has not established a binding relationship from the at least one service unit;
   establishing a message transmission channel between the service channel and the first service unit through the interface information, thereby establishing the binding relationship between the service channel and the first service unit.

6. The method according to claim 1, wherein the push request further includes a project identifier; the querying the communication interface corresponding to the service channel according to the channel identifier, includes:
   querying second service units that match the project identifier from a service unit list according to the project identifier;
   obtaining first channel identifiers of service channels that have binding relationship with the second service units;
   querying a first service channel matching the channel identifier from the first channel identifiers; and obtaining a communication interface corresponding to the first service channel.

7. The method according to claim 6, wherein when there is a binding relationship between the service channel and each service unit, the pushing the target message to the target terminals through the communication interface, includes:
   obtaining a message push task inventory of each second service unit, and
   sending the message push request to the second service unit with the smallest message push task inventory, thereby pushing the target message to the target terminal through a communication interface corresponding to the service channel bound to the second service unit with the smallest message push task inventory.

8. A message push method, comprising:
   calling a configuration interface for message push, wherein the configuration interface includes a strategy control for configuring message push strategy;
   monitoring the strategy control to obtain a message identifier of a to-be-pushed target message, terminal identifiers of target terminals for receiving the target message, and a channel identifier of a service channel for pushing the target message;
   generating a message push request according to the message identifier, terminal identifiers, and the channel identifier; and
   sending the message push request to the server, so that the server pushes the target message to the target terminals according to the channel identifier;
   wherein the method further comprises:
   querying, by the server, a communication interface corresponding to the service channel according to the channel identifier in the message push request, wherein the communication interface is a message transmission path established when a binding relationship is established between the service channel and a service unit;
   pushing the target message to the target terminals through the communication interface; wherein
   the configuration interface further includes a binding control of the service channel, the server comprises at least one service unit, and the method further comprises:
   monitoring the binding control to obtain interface information of the communication interface and a service identifier of the service unit;
   generating a binding request according to the interface information and the service identifier;
   sending the binding request to the server, so that the server establishes the binding relationship between the service channel and the service unit according to the binding request.

9. The method according to claim 8, wherein the method further includes:
   receiving statistical information sent by the server, wherein the statistical information is generated by the server according to push results of the target information;
   when receiving a statistical query instruction, generating and displaying a statistical information display interface according to the statistical information.

10. A message push apparatus, comprising: a memory, a processor and a computer program stored in the memory and executable by the processor, wherein the processor executes the computer program to:
    receive a message push request, wherein the message push request carries a message identifier of a to-be-pushed target message, terminal identifiers of target terminals for receiving the target message, and a channel identifier of a service channel for pushing the target message;
    push the target message to the target terminals according to the channel identifier;
    wherein the processor further executes the computer program to:
    query a communication interface corresponding to the service channel according to the channel identifier, wherein the communication interface is a message transmission path established when a binding relationship is established between the service channel and the service unit;

extract to-be-pushed message data from a stored message queue according to the message identifier;

when push time is reached, identify validity of the message data;

if the message data is valid, push the target message to the target terminal through the communication interface.

11. The apparatus according to claim 10, wherein the processor executes the computer program to:

receive a binding request for binding the service channel, wherein the binding request carries interface information of the communication interface and a service identifier of a service unit;

establish a binding relationship between the service channel and the service unit according to the interface information and the service identifier.

12. A message push system, comprising:

a display device;

an electronic device in communication with the display device;

wherein the electronic device is configured to execute the method according to claim 1 and a message push method including:

calling a configuration interface for message push, wherein the configuration interface includes a strategy control for configuring message push strategy;

monitoring the strategy control to obtain a message identifier of a to-be-pushed target message, terminal identifiers of target terminals for receiving the target message, and a channel identifier of a service channel for pushing the target message;

generating a message push request according to the message identifier, terminal identifiers, and the channel identifier; and sending the message push request to the server, so that the server pushes the target message to the target terminals according to the channel identifier.

13. A computer-readable storage medium, comprising a computer program stored thereon, wherein the program is executed by a processor to implement the message push according to claim 1 and a message push method including:

calling a configuration interface for message push, wherein the configuration interface includes a strategy control for configuring message push strategy;

monitoring the strategy control to obtain a message identifier of a to-be-pushed target message, terminal identifiers of target terminals for receiving the target message, and a channel identifier of a service channel for pushing the target message;

generating a message push request according to the message identifier, terminal identifiers, and the channel identifier; and sending the message push request to the server, so that the server pushes the target message to the target terminals according to the channel identifier.

* * * * *